US010081450B2

(12) United States Patent
Merrill et al.

(10) Patent No.: US 10,081,450 B2
(45) Date of Patent: Sep. 25, 2018

(54) SYSTEMS AND METHODS FOR ORIENTING CONTAINERS IN A LABELING SYSTEM

(71) Applicants: Dale C. Merrill, Enfield, NH (US); Francois Gagnon, Quebec (CA)

(72) Inventors: Dale C. Merrill, Enfield, NH (US); Francois Gagnon, Quebec (CA)

( * ) Notice: Subject to any disclaimer, the term of this patent is extended or adjusted under 35 U.S.C. 154(b) by 927 days.

(21) Appl. No.: 14/024,897

(22) Filed: Sep. 12, 2013

(65) Prior Publication Data

US 2015/0068658 A1 Mar. 12, 2015

(51) Int. Cl.

*B32B 41/00* (2006.01)
*B65C 9/34* (2006.01)
*B65C 3/16* (2006.01)

(52) U.S. Cl.

CPC .................. *B65C 9/34* (2013.01); *B65C 3/16* (2013.01); *Y10T 156/10* (2015.01); *Y10T 156/1744* (2015.01)

(58) Field of Classification Search

CPC . B65C 9/34; B65C 3/16; Y10T 156/10; Y10T 156/1744
USPC .......... 156/64, 350, 362, 363, 367, 378, 379
See application file for complete search history.

(56) References Cited

U.S. PATENT DOCUMENTS 3,928,115 A * 12/1975 Kerwin ..................... B65C 3/16 156/363
4,714,515 A * 12/1987 Hoffmann ................. B65C 3/16 156/450

* cited by examiner

*Primary Examiner* — Michael N Orlando
*Assistant Examiner* — Joshel Rivera
(74) *Attorney, Agent, or Firm* — Thompson Hine LLP

(57) ABSTRACT

A method is disclosed of orienting a container in a labeling system. The method includes the steps of: providing a plurality of containers on a conveyor wherein the containers and the conveyor are moving at a constant velocity $V_C$; receiving a captured container of the plurality of containers between a first belt that is moving at a dynamic velocity $V_A$ and a second belt that is moving at a dynamic velocity $V_B$, the first and second belts capturing opposing sides of a captured container while the captured container remains on the conveyor, wherein at the time of capturing the container between the first and second belts, $V_A$, $V_B$ and $V_C$ are substantially equal to each other; applying a label to the container using the first and second belts by adjusting the velocities $V_A$ and $V_B$; adjusting the orientation of the captured container by further adjusting the velocities $V_A$ and $V_B$; and releasing the captured container from the first and second belts at the velocity $V_C$ on the conveyor, wherein at the time of releasing the container from between the first and second belts, $V_A$, $V_B$ and $V_C$ are substantially equal to each other.

21 Claims, 17 Drawing Sheets

| **Application Parameters** | | |
|---|---|---|
| Prod. Rate | 220.000 | BPM |
| Feedscrew Pitch | 6.000 | in |
| Bottle Dia. | 2.000 | in |
| Label Length | 4.000 | in |
| Match Speed Dist. | 0.250 | in |

FIG. 5A

| | Coordinates | | |
|---|---|---|---|
| | X (sec) | $Y_A$ (in/sec) | $Y_B$ (in/sec) |
| t1 | 0.000 | 22 | 22 |
| t2 | 0.011 | 22 | 22 |
| t3 | 0.125 | 95 | -51 |
| t4 | 0.239 | 22 | 22 |
| t5 | 0.250 | 22 | 22 |
| | MAX | 95 | -51 |

FIG. 5B

| | | |
|---|---|---|
| Conv. Speed | 22.000 | in/sec |
| Total Appl. Time | 0.250 | sec |
| Match Time | 0.0114 | sec |
| Accel. Time | 0.1136 | sec |
| Accel. Rate | 641.44987 | in/sec^2 |

FIG. 5C

| **Mechanical Verification (Wrap) A** | | |
|---|---|---|
| Driven Radius | 1.014 | in |
| Reducer Ratio | 3 | |
| Motor Speed | 2680.9 | PM |

FIG. 5D

| **Mechanical Verification (Backing) B** | | |
|---|---|---|
| Driven Radius | 1.014 | in |
| Reducer Ratio | 3 | |
| Motor Speed | 1437.8 | RPM |

FIG. 5E

| | Label Cam | | | | Belt 1 | | | Belt 2 | | | Bottle | | Conveyor |
|---|---|---|---|---|---|---|---|---|---|---|---|---|---|
| Segment | t | Acc label | Vel label | Dist label | Acc | Vel | Dist | Acc | Vel | Dist | Dist bottle | Deg bottle | Dist |
| 0 - Start of Labeling | 0.000 | 2868 | 0.000 | 0.000 | 0 | 29.333 | 0.000 | 0 | 29.333 | 0.000 | 0.000 | 0.0 | 0.000 |
| 1 - Labeling at conveyer | 0.010 | 0 | 29.333 | 0.150 | 0 | 29.333 | 0.300 | 0 | 29.333 | 0.300 | 0.300 | 0.0 | 0.300 |
| 2 - Accelerating labeling / Start rolling bottle | 0.019 | 2783 | 29.333 | 0.400 | 2783 | 29.333 | 0.550 | -2783 | 29.333 | 0.550 | 0.550 | 0.0 | 0.550 |
| 3 - Decelerate labeling | 0.046 | -2783 | 106.228 | 2.273 | -2783 | 106.228 | 2.423 | 2783 | -47.562 | 0.298 | 1.360 | 64.9 | 1.360 |
| 4 - Label fully detached / Start orientation | 0.075 | -2783 | 26.378 | 4.175 | 1616 | 26.378 | 4.325 | -1616 | 32.288 | 0.079 | 2.202 | 129.7 | 2.202 |
| 5 - Labeling completed | 0.085 | 0 | 0.000 | 4.300 | 1616 | 41.695 | 4.648 | -1616 | 16.971 | 0.312 | 2.480 | 132.5 | 2.480 |
| 6 - Decelerate orientation | 0.136 | 0 | 0.000 | 4.300 | -1616 | 125.596 | 8.990 | 1616 | -66.930 | -0.984 | 4.003 | 304.8 | 4.003 |
| 7 - End of orientation / Stabilize rotation | 0.196 | 0 | 0.000 | 4.300 | 0 | 29.333 | 13.604 | 0 | 29.333 | -2.104 | 5.750 | 120.0 | 5.750 |
| 8 - End of cycle / Bottle Exits belts | 0.205 | 0 | 0.000 | 4.300 | 0 | 29.333 | 13.854 | 0 | 29.333 | -1.854 | 6.000 | 120.0 | 6.000 |

FIG. 7A

Parameters:

| | | |
|---|---|---|
| Label web pitch: | 4.30 | inches |
| Conveyer speed: | 29.33 | inches/sec |
| Labeling acceleration distance: | 0.15 | inches |
| Labeling distance before rolling bottle: | 0.25 | inches |
| Bottle pitch: | 6.00 | inches |
| Required printing time (web stopped): | 0.12 | sec |
| Total cycle time: | 0.20 | sec |
| Web distance after label has fully released: | 0.13 | inches |
| Distance after wrapping: | 0.25 | inches |
| Desired orientation angle: | 120.00 | degrees |
| Bottle radius: | 0.94 | inches |

FIG. 7B

Intermediate Results:

| | | |
|---|---|---|
| Labeling time while rotating: | 0.066 | sec |
| Distance travelled while rotating: | 3.900 | inches |
| Time diff to accelerate to max speed: | 0.028 | sec |
| Top speed reached while rotating: | 106.228 | inches/sec |
| Dispensing time: | 0.085 | sec |
| Label accel/decel while rotating: | 2783.134 | inches/sec2 |
| Time betw label release and label stop: | 0.009 | sec |
| Orient angular displacem. after label release: | 350.254 | degrees |
| Orientation time after label release: | 0.121 | sec |
| Orient 1st Belt Distance: | 9.279 | inches |
| Orient time to reach max speed: | 0.061 | sec |
| Orient top speed: | 125.596 | inches/sec |
| Orient left belt accel/decel: | 1616.147 | inches/sec2 |

FIG. 7C

| Segment | t | Acc label | Acc. Belt 1 | Acc. Belt 2 |
|---|---|---|---|---|
| 0 - Start of Labeling | 0 | 2868.083 | 0 | 0 |
| | 0.010227 | 2868.083 | 0 | 0 |
| 1 - Labeling at conveyor | 0.010227 | 0 | 0 | 0 |
| | 0.01875 | 0 | 0 | 0 |
| 2 - Accelerating labeling / Start rolling bottle | 0.01875 | 2783.134 | 2783.134 | -2783.13 |
| | 0.046379 | 2783.134 | 2783.134 | -2783.13 |
| 3 - Decelerate labeling | 0.046379 | -2783.13 | -2783.13 | 2783.134 |
| | 0.07507 | -2783.13 | -2783.13 | 2783.134 |
| 4 - Label fully detached / Start orientation | 0.07507 | -2783.13 | 1616.147 | -1616.15 |
| | 0.084548 | -2783.13 | 1616.147 | -1616.15 |
| 5 - Labeling completed | 0.084548 | 0 | 1616.147 | -1616.15 |
| | 0.136462 | 0 | 1616.147 | -1616.15 |
| 6 - Decelerate orientation | 0.136462 | 0 | -1616.15 | 1616.147 |
| | 0.196025 | 0 | -1616.15 | 1616.147 |
| 7 - End of orientation / Stabilize rotation | 0.196025 | 0 | 0 | 0 |
| | 0.204548 | 0 | 0 | 0 |
| 8 - End of cycle / Bottle Exits belts | 0.204548 | 0 | 0 | 0 |

FIG. 9

FIG. 11

| t | Segment | SegmentStartTime | Dist label | Dist B1 | Dist B2 | Dist bottle | Deg bottle |
|---|---|---|---|---|---|---|---|
| 0.000 | 0 | 0.000 | 0.000 | 0.000 | 0.000 | 0.000 | 0.000 |
| 0.005 | 0 | 0.000 | 0.036 | 0.147 | 0.147 | 0.147 | 0.000 |
| 0.010 | 0 | 0.000 | 0.143 | 0.293 | 0.293 | 0.293 | 0.000 |
| 0.015 | 1 | 0.010 | 0.290 | 0.440 | 0.440 | 0.440 | 0.000 |
| 0.020 | 2 | 0.019 | 0.439 | 0.589 | 0.584 | 0.587 | 0.133 |
| 0.025 | 2 | 0.019 | 0.638 | 0.788 | 0.679 | 0.733 | 3.322 |
| 0.030 | 2 | 0.019 | 0.906 | 1.056 | 0.704 | 0.880 | 10.763 |
| 0.035 | 2 | 0.019 | 1.244 | 1.394 | 0.659 | 1.027 | 22.457 |
| 0.040 | 2 | 0.019 | 1.652 | 1.802 | 0.545 | 1.173 | 38.403 |
| 0.045 | 2 | 0.019 | 2.129 | 2.279 | 0.361 | 1.320 | 58.601 |
| 0.050 | 3 | 0.046 | 2.639 | 2.789 | 0.144 | 1.467 | 80.822 |
| 0.055 | 3 | 0.046 | 3.085 | 3.235 | -0.008 | 1.613 | 99.114 |
| 0.060 | 3 | 0.046 | 3.461 | 3.611 | -0.091 | 1.760 | 113.154 |
| 0.065 | 3 | 0.046 | 3.768 | 3.918 | -0.105 | 1.907 | 122.941 |
| 0.070 | 3 | 0.046 | 4.005 | 4.155 | -0.049 | 2.053 | 128.476 |
| 0.075 | 3 | 0.046 | 4.173 | 4.323 | -0.077 | 2.200 | 129.759 |
| 0.080 | 4 | 0.075 | 4.271 | 4.475 | 0.219 | 2.347 | 130.056 |
| 0.085 | 5 | 0.085 | 4.300 | 4.667 | 0.320 | 2.493 | 132.822 |
| 0.090 | 5 | 0.085 | 4.300 | 4.899 | 0.381 | 2.640 | 138.058 |
| 0.095 | 5 | 0.085 | 4.300 | 5.172 | 0.402 | 2.787 | 145.763 |
| 0.100 | 5 | 0.085 | 4.300 | 5.485 | 0.382 | 2.933 | 155.937 |
| 0.105 | 5 | 0.085 | 4.300 | 5.838 | 0.322 | 3.080 | 168.580 |
| 0.110 | 5 | 0.085 | 4.300 | 6.232 | 0.221 | 3.227 | 183.693 |
| 0.115 | 5 | 0.085 | 4.300 | 6.667 | 0.080 | 3.373 | 201.275 |
| 0.120 | 5 | 0.085 | 4.300 | 7.141 | -0.101 | 3.520 | 221.326 |
| 0.125 | 5 | 0.085 | 4.300 | 7.657 | -0.323 | 3.667 | 243.847 |
| 0.130 | 5 | 0.085 | 4.300 | 8.212 | -0.586 | 3.813 | 268.837 |
| 0.135 | 5 | 0.085 | 4.300 | 8.808 | -0.888 | 3.960 | 296.296 |
| 0.140 | 6 | 0.136 | 4.300 | 9.424 | -1.211 | 4.107 | 324.988 |
| 0.145 | 6 | 0.136 | 4.300 | 10.003 | -1.497 | 4.253 | 351.422 |
| 0.150 | 6 | 0.136 | 4.300 | 10.542 | -1.742 | 4.400 | 15.386 |
| 0.155 | 6 | 0.136 | 4.300 | 11.041 | -1.947 | 4.547 | 36.881 |
| 0.160 | 6 | 0.136 | 4.300 | 11.499 | -2.112 | 4.693 | 55.907 |
| 0.165 | 6 | 0.136 | 4.300 | 11.916 | -2.236 | 4.840 | 72.464 |
| 0.170 | 6 | 0.136 | 4.300 | 12.293 | -2.320 | 4.987 | 86.551 |
| 0.175 | 6 | 0.136 | 4.300 | 12.630 | -2.363 | 5.133 | 98.169 |
| 0.180 | 6 | 0.136 | 4.300 | 12.926 | -2.367 | 5.280 | 107.318 |
| 0.185 | 6 | 0.136 | 4.300 | 13.182 | -2.329 | 5.427 | 113.997 |
| 0.190 | 6 | 0.136 | 4.300 | 13.398 | -2.251 | 5.573 | 118.207 |
| 0.195 | 6 | 0.136 | 4.300 | 13.573 | -2.133 | 5.720 | 119.948 |
| 0.200 | 7 | 0.196 | 4.300 | 13.721 | -1.987 | 5.867 | 120.000 |
| 0.205 | 8 | 0.205 | 4.300 | 13.867 | -1.841 | 6.013 | 120.000 |

SYSTEMS AND METHODS FOR ORIENTING CONTAINERS IN A LABELING SYSTEM

BACKGROUND

The invention generally relates to labeling machines, and relates in particular to labeling machines that require that containers, such as bottles, to be labeled are at some point oriented in consisted orientations for processing. Such processing may, for example, involve applying a label or an outsert to a container in a particular location with respect to the container. As used herein, the term outsert generally means any single sheet, folded or booklet bound article that is intended to be applied to an article such as a container for providing information to a purchaser of the article. For example, the information may include dosage information for a medication contained within the container, or conflicting medication information for a medication, or medication conditions requirements information etc.

For example, following the application of a label in a labeling machine, a container such as a bottle may continue to rotate or may migrate on a container conveyor. If subsequent processing steps are required (such as the application of a second label or an outsert), the actions taken to apply the initial label as well as any subsequent movement may adversely affect the processing of the containers. Moreover, many conventional automated label application systems either stop while each container is processed, or continuously feed containers along a conveyor, requiring that the processing steps do not significantly change the spacing (pitch) of the containers.

There is a need for an economical and efficient system that labels containers and provides the labeled containers at high speeds in a specific and consistent desired orientation with respect to the direction of movement of the conveyor. A subsequent labeling operation may include applying a second label or outsert to the container, wherein the second label or outsert is applied to the container, centered in an area that is not covered by the primary label. While systems that will optically analyze a labeled container to locate and orient such containers may be developed, such systems would require further processing steps as well as further complex machinery and processing.

Further, it is desirable to provide a labeling system that may be easily adjusted to provide for the application of different labels to a variety of containers in different runs. Since different labels and different containers will result in the labeled containers being provided at different orientations with respect to the direction of movement of the conveyor, there is a need for a system for orienting the containers with respect to the direction of movement of the conveyor.

The bottle pitch for a rotary labeling machine, for example, will always be constant. Rotary labeling machines take the bottles off of the primary (liner) conveyor, for example, using a star-wheel, and place them into a rotating turret with a number of bottle rotating stations that clamp individual bottles in place from the top and bottom, allowing each bottle to be rotated independently of the other as needed for orienting.

Once processed by the labeling machine, the bottles are placed back on the primary conveyor using another star-wheel. A limitation of certain prior art rotary labeling systems is that the rotations are generated through cams, and the cams must be changed to generate different motion profiles as would be required to orient different label and container combinations.

Other prior art rotary labeling machines employ a servomotor on each bottle rotating station within the turret, allowing much more flexibility than using cams. Either way however, the cost and complexity of a rotary labeling machine is much higher than that of using a linear labeling machine.

Certain oscillating pressure station machines also will label bottles and inherently orient the label, as will other methods of wiping down the leading and trailing edges of the label, such as using chaser rollers for trailing label edges, and wipers for leading edges, all while the pitch stays constant. In general, the primary label is initially applied to the side of the bottle (with reference to the direction of travel), such that the centerline of the label is applied to the centerline of the side of the bottle. In the case of a round bottle, only a short section of label on either side of the centerline may be initially adhered to the bottle.

A wiper may be used to apply both leading and side portions of the label, centered as described above. The rest of the label is applied in a subsequent operation, using rubber pads (typical for round containers) or bristle brushes (typical for rectangular containers) to press the label in place. A limitation for such systems, is the brush or pad travel distance that the subsequent operation may be able to accommodate. Generally, an increase in brush or pad stroke distance means a decrease in operating speed. Neither a brush or pad may reach much beyond 180 degrees of wrap on a round container.

There is a need therefore, for a labeling system that accurately and consistently provides labeled containers at a desired orientation with respect to a direction of movement of the conveyor. There is a need in particular, for a labeling system that can apply long labels to round bottles, and then provide the labeled bottles to a secondary processing stations such as an outsert application station. There is further a need for such a system that is efficient and economical to produce and use.

SUMMARY

In accordance with an embodiment, the invention provides a method of orienting a container in a labeling system. The method includes the steps of: providing a plurality of containers on a conveyor wherein the containers and the conveyor are moving at a constant velocity $V_C$; receiving a captured container of the plurality of containers between a first belt that is moving at a dynamic velocity $V_A$ and a second belt that is moving at a dynamic velocity $V_B$, the first and second belts capturing opposing sides of a captured container while the captured container remains on the conveyor, wherein at the time of capturing the container between the first and second belts, $V_A$, $V_B$ and $V_C$ are substantially equal to each other; applying a label to the container using the first and second belts by adjusting the velocities $V_A$ and $V_B$; adjusting the orientation of the captured container by further adjusting the velocities $V_A$ and $V_B$; and releasing the captured container from the first and second belts at the velocity $V_C$ on the conveyor, wherein at the time of releasing the container from between the first and second belts, $V_A$, $V_B$ and $V_C$ are substantially equal to each other.

In accordance with another embodiment, the invention provides a method of labeling and orienting a container in a labeling system. The method includes the steps of: providing a plurality of containers on a conveyor wherein the containers and the conveyor are moving at a constant velocity $V_C$; feeding a label toward an area between the first belt and the second belt such that an exposed adhesive side of the label may be applied to the captured container between the first belt and the second belt; receiving a captured container of the plurality of containers between a first belt that is moving at a dynamic velocity $V_A$ and a second belt that is moving at a dynamic velocity $V_B$, said first and second belts capturing opposing sides of a captured container while the captured container remains on the conveyor, wherein at the time of capture, $V_A$, $V_B$ and $V_C$ are substantially equal to each other; adjusting the velocities of $V_A$ and $V_B$ to rotate the captured container so as to cause the label to become applied to the captured container; adjusting the orientation of the captured container by adjusting the velocities $V_A$ and $V_B$; and releasing the captured container from the first and second belts, wherein at the time of releasing the captured container, $V_A$, $V_B$ and $V_C$ are substantially equal to each other.

In accordance with a further embodiment, the invention provides a labeling and orienting system for labeling containers on a conveyor and for orienting the containers on the conveyor. The system includes a first belt assembly including a first belt that is moving at a dynamic velocity $V_A$ and a second belt assembly including a second belt that is moving at a dynamic velocity $V_B$, the first and second belts being positioned to capture opposing sides of a captured container while the captured container remains on the conveyor. The system also includes means for feeding a label toward area between the first belt and the second belt such that an exposed adhesive side of the label may contact the captured container; and label application and orientation means for adjusting the velocities of $V_A$ and $V_B$ to rotate the captured container so as to cause the label to become attached to the captured container and for adjusting the orientation of the captured container by adjusting the velocities $V_A$ and $V_B$, wherein $V_A$ and $V_B$ are each substantially equal to $V_C$ when the container is captured between the first belt and the second belt, and again when the captured container is released from the first belt and the second belt.

BRIEF DESCRIPTION OF THE DRAWINGS

The following description may be further understood with reference to the accompanying drawings in which:

FIGS. 5A-5E show illustrative tables of application parameters, coordinates, operational parameters and verification parameters in accordance with an embodiment of the present invention;

FIGS. 7A-7C show illustrative tables of operational parameters and results including velocities, rotation and distance of a label, the belts and the container for a labeling and orientation system in accordance with an embodiment of the present invention;

FIG. 9 shows an illustrative table of operational acceleration parameters at different times during a labeling and orienting event in a labeling and orientation system in accordance with an embodiment of the present invention;

FIG. 11 shows an illustrative table of operational parameters including distance of the label and bottle as well as degree of rotation of the bottle in a system in accordance with an embodiment of the present invention;

The drawings are shown for illustrative purposed only.

DETAILED DESCRIPTION

In accordance with an embodiment, the invention provides a labeling and container orientation system as well as a method operation of such a system that reduces mass and therefore inertia of the moving parts of the system for very high dynamic response of the belts that are used to rotate the container. Systems of certain embodiments of the invention also provide that the inertia of the drive motors that control the orientation belts closely match the driven load inertia so as to provide a very high dynamic response of the belts.

Figure 1:
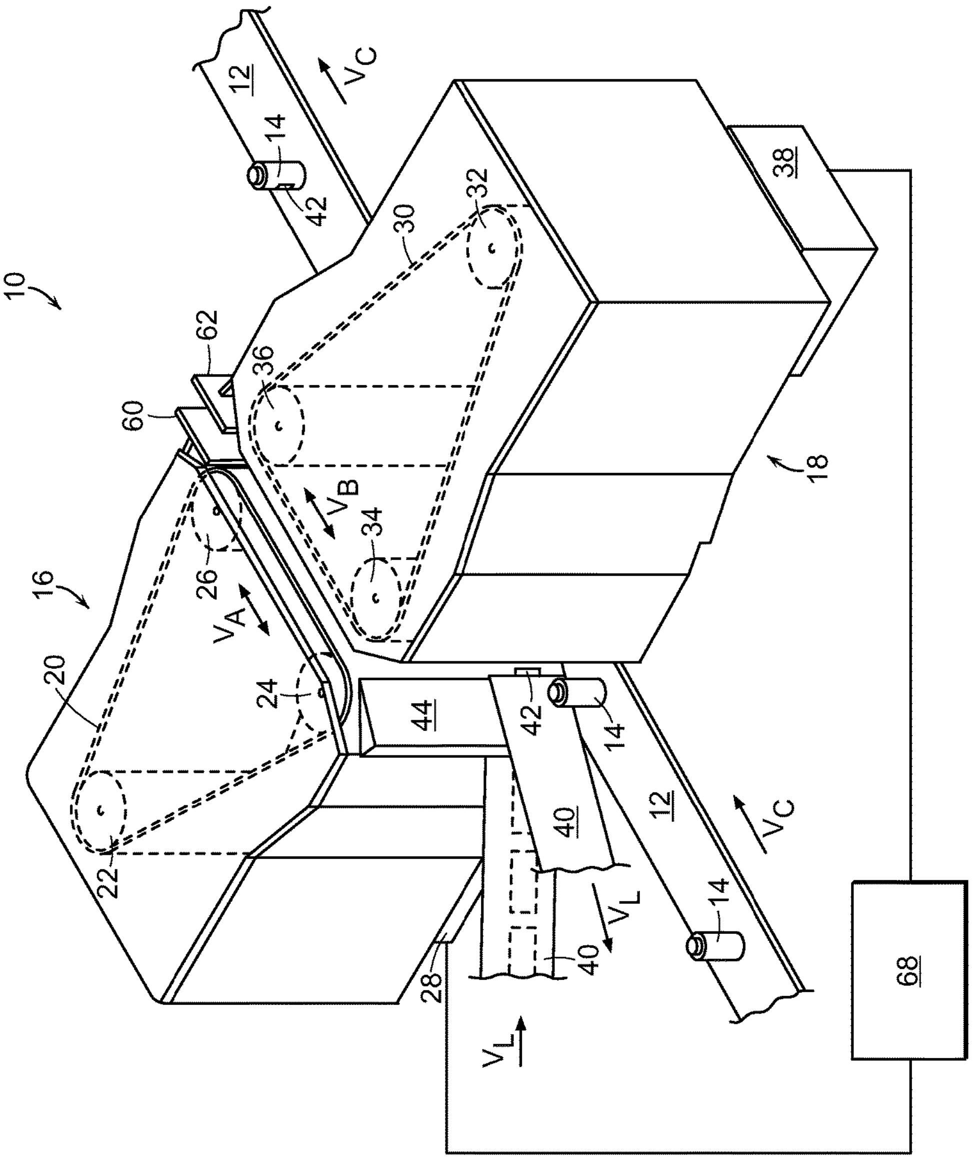
FIG. 1 shows an illustrative diagrammatic view of a labeling and orienting system in accordance with an embodiment of the present invention.

As shown in FIG. 1, a system 10 in accordance with an embodiment of the invention includes a conveyor 12 that carries containers 14. The containers 14 pass through a labeling and orientation station that includes a first belt assembly 16 and a second belt assembly 18. The first belt assembly 16 includes a first belt 20 that is driven by a drive pulley 22 around two idler pulleys 24 and 26. The drive pulley 22 is coupled to a first drive motor 28. The second belt assembly 18 includes a second belt 30 that is driven by a drive pulley 32 around two idler pulleys 34 and 36. The drive pulley 32 is coupled to a second drive motor 38.

A silicone coated release liner 40 carries adhesive backed labels 42 over a peel plate 44 that is proximate the first belt 20 near the idler pulley 24. As the release liner 40 with labels 42 are drawn over the peel plate 44, the labels peel away from the release liner 40, and the adhesive side of the labels 42 contact containers. In the system 10, each container is received by the first and second belt assemblies and is pinched between the first and second belts at the same time that a label is fed between the container and the first belt, causing the label to stick to the container.

Figure 2:
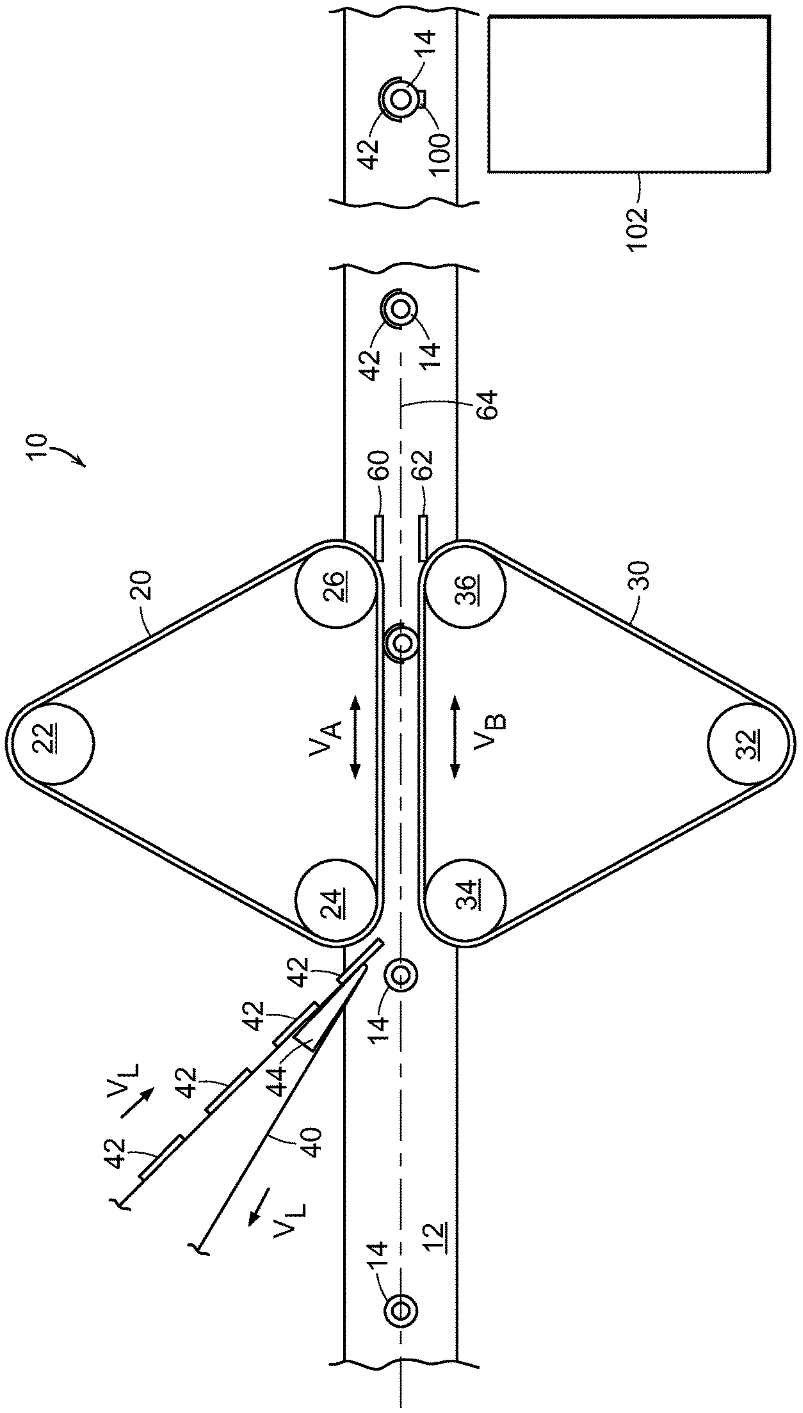
FIG. 2 shows an illustrative diagrammatic plan view of the labeling and orienting system of FIG. 1.

With further reference to FIG. 2, the conveyor 12 moves at a constant velocity of $V_C$, the first belt 20 moves at a non-constant velocity $V_A$, the second belt moves at a non-constant velocity $V_B$, and the release liner moves at a constant velocity $V_L$. The label feed velocity $V_L$ and the first belt velocity $V_A$ are coordinated so that the label is rolled onto the container. At least the first belt 20 therefore facilitates the application of each label to each container. The labels on the release liner 40 may be provided by a supply spool (not shown) and after each label is transferred to a container, the release liner without the labels is drawn from the peel edge to a pickup spool (not shown).

The labels may enter the labeling and orientation system either in flag-on or roll-on mode. In flag-on mode, the adhesive side of the label first contacts the container, and the non-adhesive side of the label is then received against the first belt. In roll-on mode, the non-adhesive side of the label is first contacted against the first belt, and the adhesive side of the label subsequently contacts the container.

Figure 3:
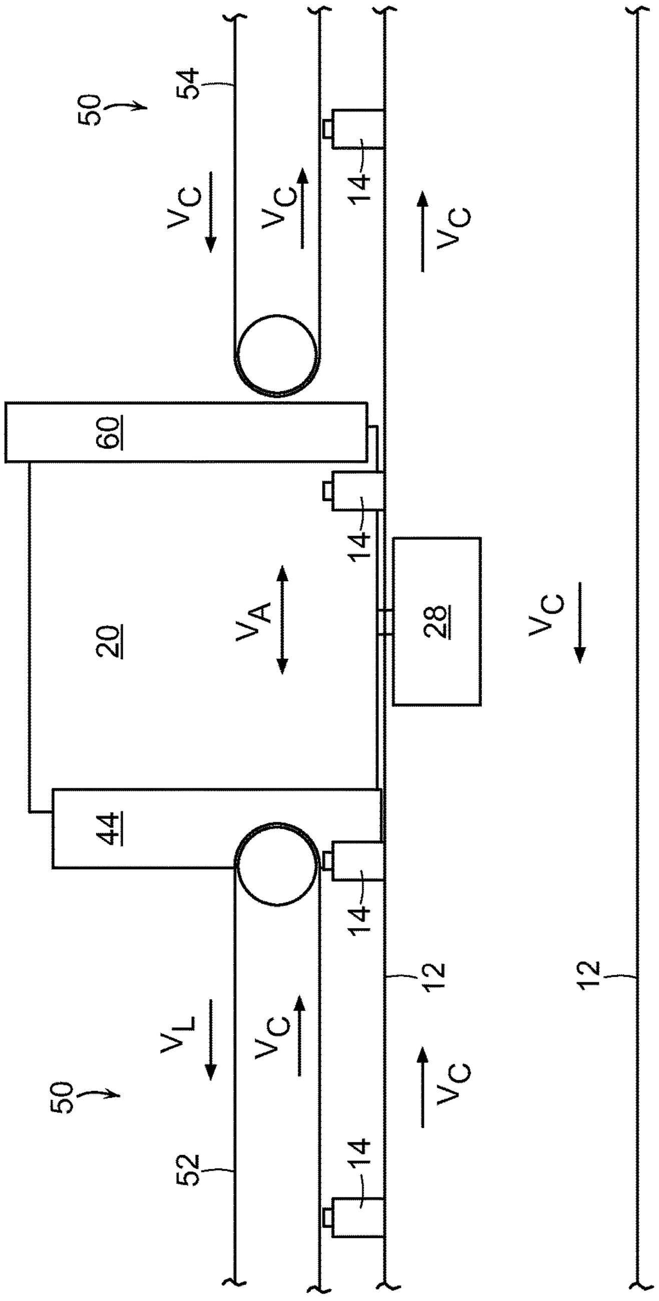
FIG. 3 shows an illustrative diagrammatic side view of the labeling and orienting system of FIG. 1 including an optional top belt assembly.

The first belt assembly 16 may also include a first guide plate 60 and the second belt assembly 18 may include a second guide plate 62 that cooperate to guide and stabilize the containers 14 as they leave the first and second belts 20, 30. In certain embodiments, as further shown in FIG. 3, a top belt assembly 50 (not shown in FIGS. 1 and 2) may also be provided that includes belts 52 and 54 that capture the tops of the containers 14 to further provide stabilization of the containers 14 on the conveyor 12 both prior to and following the labeling and orientation station. In other embodiments, a top belt assembly may include one belt only that employs a rail on the back side of the single top belt prior to and following the labeling and orientation station. The rail prior to and following the labeling and orientation station causes the belt to act on the top of the container, but when the container is in the labeling and orientation station, the top belt is not urged against the top of the container, permitting the container to be rotated by the first and s A belt controller 68 (shown in FIG. 1) is coupled to the first and second drive motors 28, 38 to independently operate the first and second drive pulleys 22, 32 as discussed in more detail below. The control of belt velocity and direction is important to achieve belt control, and in accordance with various embodiments of the invention, different motion profiles may be provided for different operating parameters. One container only may be captured between the orientation belts (the first and second belts 20, 30) at any given time. Both belts 20, 30 match the conveyor velocity (and therefore the container velocity) for a very short distance when each container (bottle) enters and exits the system. In particular, at entry, the velocity matching is provided so that no containers become dislodged and fall over, since the container is trapped with no slippage between the bottle and the belts or conveyor. At entry, the velocity is matched so that slippage occurs between the belts and the bottle, so that the position and orientation is maintained. Once trapped between the belts, there is no slippage between the belts and the bottles. At the exit, the belts and the bottles again have matched velocities to facilitate having the bottles remain upright and in position on the conveyor. Otherwise, the side force from the belts may cause the bottle to pop out from the belts, and if a bottle were rotating upon exit, it may continue to rotate.

Upon entry into the labeling and orientation system, the belt 20 on the same side as the label peel plate matches the motion of the incoming label, as produced by the label application portion of the machine. The opposing belt 30 may have a motion profile that decreases in speed, stopping or even running in the reverse direction for a short time, before matching the conveyor speed and the container at the exit of the orientation system. At the point of exit from the orientation system, each container remains upright and the containers are each provided in a desired orientation with respect to the direction of movement of the conveyor. At all times, therefore, the containers are maintained at the same spacing (pitch) at the entrance and exit of the labeling and orientation system; they do not slip at all with respect to the conveyor. So, while $V_C$ is constant but $V_A$ and $V_B$ are non-constant, at all times:

$$V_C=(V_A+V_B)/2$$

During the time therefore, of capturing a container between the first and second belts, $V_A$, $V_B$ and $V_C$ are substantially equal (which includes exactly equal) to each other, and at the time of releasing the container from the first and second belts, $V_A$, $V_B$ and $V_C$ are again substantially equal (which includes exactly equal) to each other.

Further, at all times, each container remains centered along the centerline 64 of the conveyor as shown in FIG. 2. Following application of the label 42 and orientation of the container 14 on the conveyor 12, the system may provide the containers to a subsequent processing station such as an outsert application station 102 for applying outserts 100 onto the containers 14 as disclosed, for example, in U.S. Patent Application Publication No. 2013-0146208, the disclosure of which is hereby incorporated by reference in its entirety.

Figure 4:
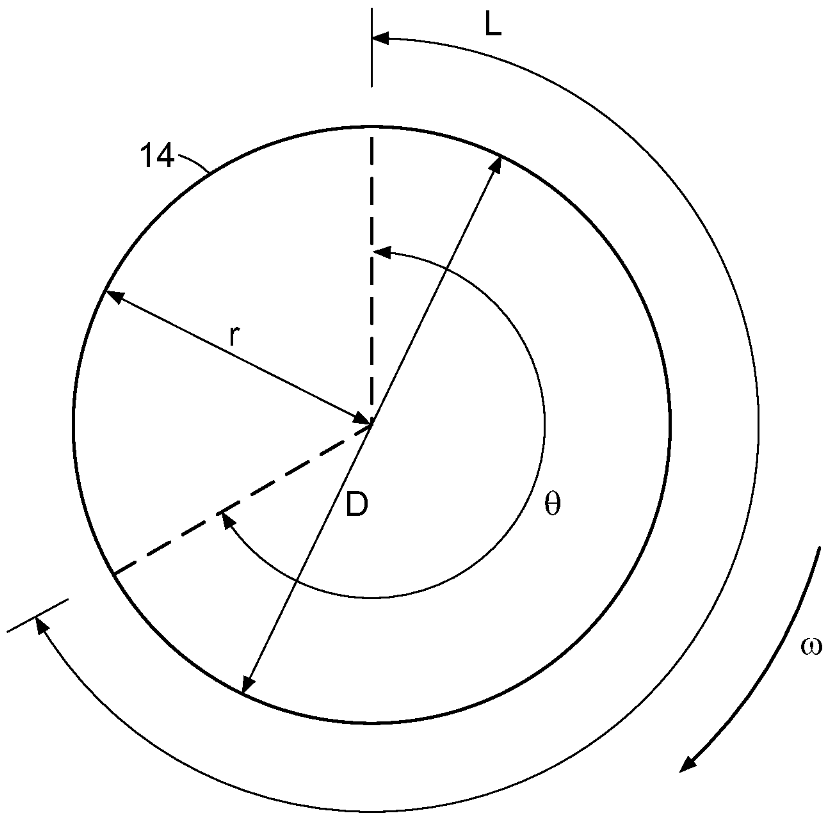
FIG. 4 shows an illustrative schematic view of a container illustrating container parameters for use in a labeling and orienting system in accordance with an embodiment of the present invention.

As shown diagrammatically in FIG. 4, a round container 14 having a radius r and a diameter D may have a label applied to the container that will cover a circumferential distance L of the surface of the container that ranges over an angle θ. The angular velocity ω of the container during orientation by the first and second belts is defined as:

$$\omega=(V_A-V_B)/D$$

For example, a label first contacts a container and the container is then rotated at a rate ω until the label is fully applied. Then container then continues rotating to the starting point where the label first contacted the container. Now, to orient the container to a desired orientation for application of a second label or an outsert, the container is then rotated a distance of L/2. So, the total distance of rotation is given by πD+L/2.

If the time to rotate the angle θ is t, it is known that θ=ωt. Since $\omega=(V_A-V_B)/D$, it is known that:

$$\frac{\theta}{t}=\frac{V_A-V_B}{D}$$

The belt linear velocities may then be determined as:

$$V_A=V_0+at$$

$$V_B-V_0-at$$

wherein $V_0$ is the initial velocity and a is the acceleration. Note that the second belt turns in the opposite direction as the first belt at this point in time. Substituting for $V_A$ and $V_B$, it is known that:

$$\frac{\theta}{t}=\frac{(V_0+at)-(V_0-at)}{D}$$

which becomes:

$$\frac{\theta}{t}=\frac{2at}{D}$$

Solving for a provides:

$$a = \frac{\theta D}{2t^2}$$

With reference again to FIG. 4, we know that L=θr=θD/2. Solving for θ provides:

$$\theta = \frac{2L}{D}$$

To determine the acceleration of the belts, it may then be determined that:

$$a = \frac{\theta D}{2t^2} = \frac{(2L/D)(D)}{2t^2}$$

which may be simplified to:

$$a = \frac{L}{t^2}$$

Since there is no slippage between the center of the container and the conveyor, the arc length L is equal to the linear distance traveled by the belt.

FIG. 5A shows, for example, application parameters for a system in accordance with an embodiment of the present invention in which the production rate is 220 bottles per minute, the feedscrew pitch is 6 inches, the bottle diameter is 2 inches, the label length is 4 inches and the matched speed distance is 0.25 inches at the inlet and 0.25 inches at the exit. FIG. 5B shows coordinates for X, $Y_A$ and $Y_B$ for five points in time during the processing of one container (as shown graphically in FIG. 6). FIGS. 5C-5E show conveyor speed, total application time, match time and acceleration time and rate, as well as mechanical verification of the first (also called wrap) belt and the second (also called backing) belt.

Figure 6:
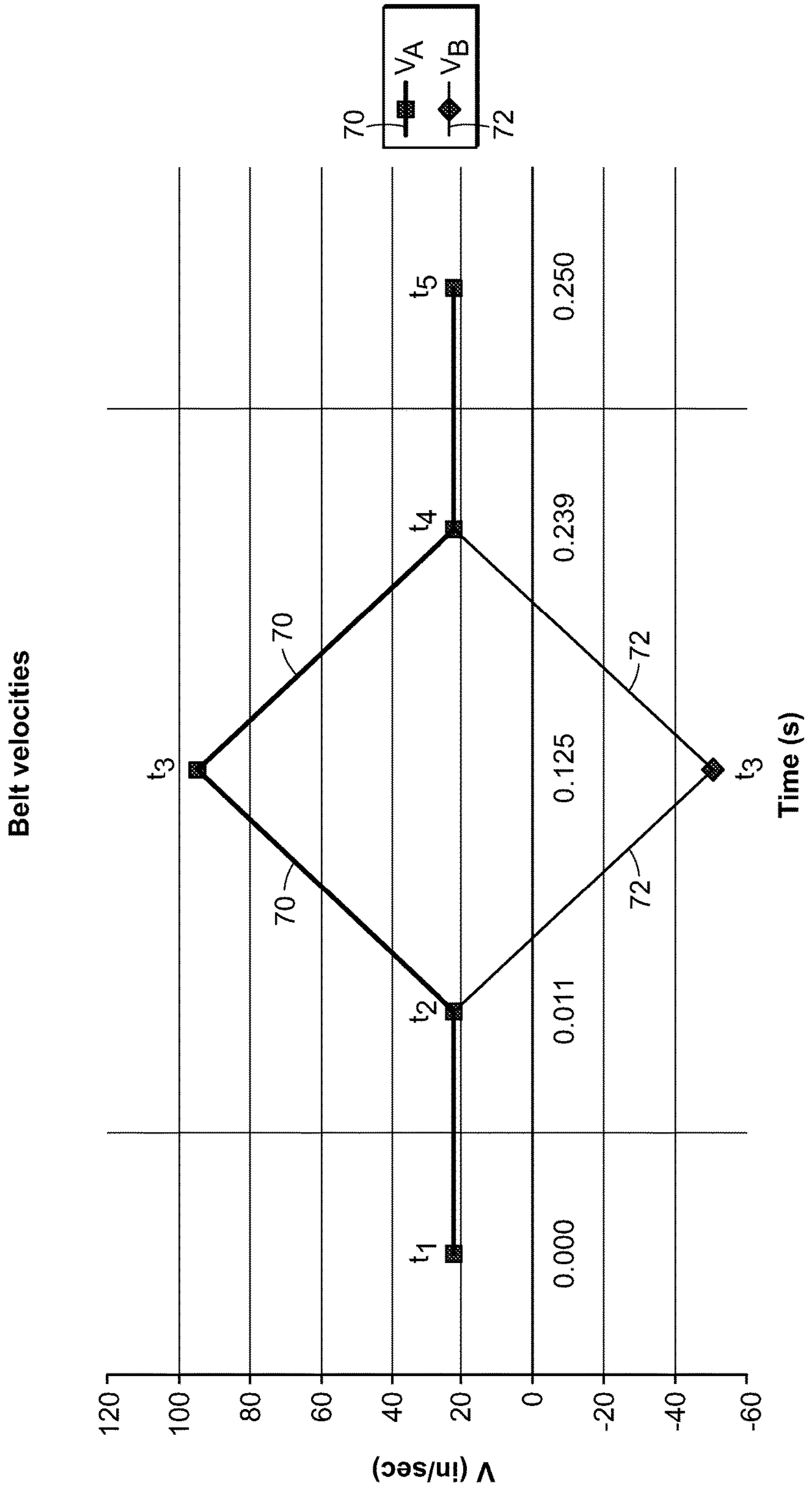
FIG. 6 shows an illustrative graphical representation of belt velocities for two opposing label application and orientation belts in accordance with an embodiment of the present invention.

FIG. 6 shows at 70 and 72 belt velocities for the first and second belts ($V_A$ is shown at 70 and $V_B$ is shown at 72) in connection with the coordinates of FIG. 5B. From time $t_1$ to $t_2$, both belts have the same speed ($V_C$), and from time $t_4$ to $t_5$, both belts also have the same speed ($V_C$). From time $t_2$ to $t_3$, the first belt is accelerating (by a) and the second belt is decelerating (by −a). From time $t_3$ to $t_4$, the first belt is decelerating (by −a) and the second belt is accelerating (by a).

By maintaining both belts as having matched acceleration and deceleration, the velocities of the two belts always sum to $V_C$, so the pitch of the containers is never lost. At certain times, the velocity of the second (or back belt) will be negative, so the belt is moving in a reverse direction with respect to the conveyor. To calculate the acceleration required for $V_A$, the total distance that a bottle must rotate, is again, provided by πD+L/2. The bottle pitch P (e.g., 6 inches) must be greater than the distance Y (e.g., 5.5 inches) between the pulley wheels 24 and 26 to ensure that only one bottle at a time is between the belts 20 and 30. In accordance with an example therefore, if the production rate is 220 bottles per minute, it may be determined that:

$$V_c = \frac{220\text{ bottles}}{\text{min}}\left(\frac{6\text{ inches}}{\text{bottle}}\right)\left(\frac{1\text{ min}}{60\text{ sec}}\right) = 22\text{ inches/sec}$$

The time that velocities of the first and second belts match is provided by:

$$t_M = V_C = 0.25\text{ inches}/22\text{ inches/sec.} = 0.114\text{ sec.}$$

wherein M is a distance of travel (e.g., 0.25 Y) with matched belt speeds.

Since the acceleration time is the distance that the conveyor travels during acceleration and deceleration, it may be determined that:

$$\text{Acceleration time} = \frac{0.5(Y - 2M)}{V_C} = \frac{0.5(5.5 - 2(0.25))}{22.0} = 0.1136\text{ sec.}$$

The acceleration required is therefore, provided by:

$$a = \frac{L}{t^2} = \frac{\pi D + L/2}{\left[\frac{(0.5(Y-2))}{V_C}\right]^2} = \frac{\pi(2.0) + 4/2}{(0.1136)^2} = 641.86\text{ inches/sec.}^2$$

Since the acceleration of the belts is split equally, the deceleration rate for the first belt is the negative of the acceleration rate. The second belt has an acceleration and deceleration that is equal but opposite the acceleration and deceleration of the first belt.

Figure 8:
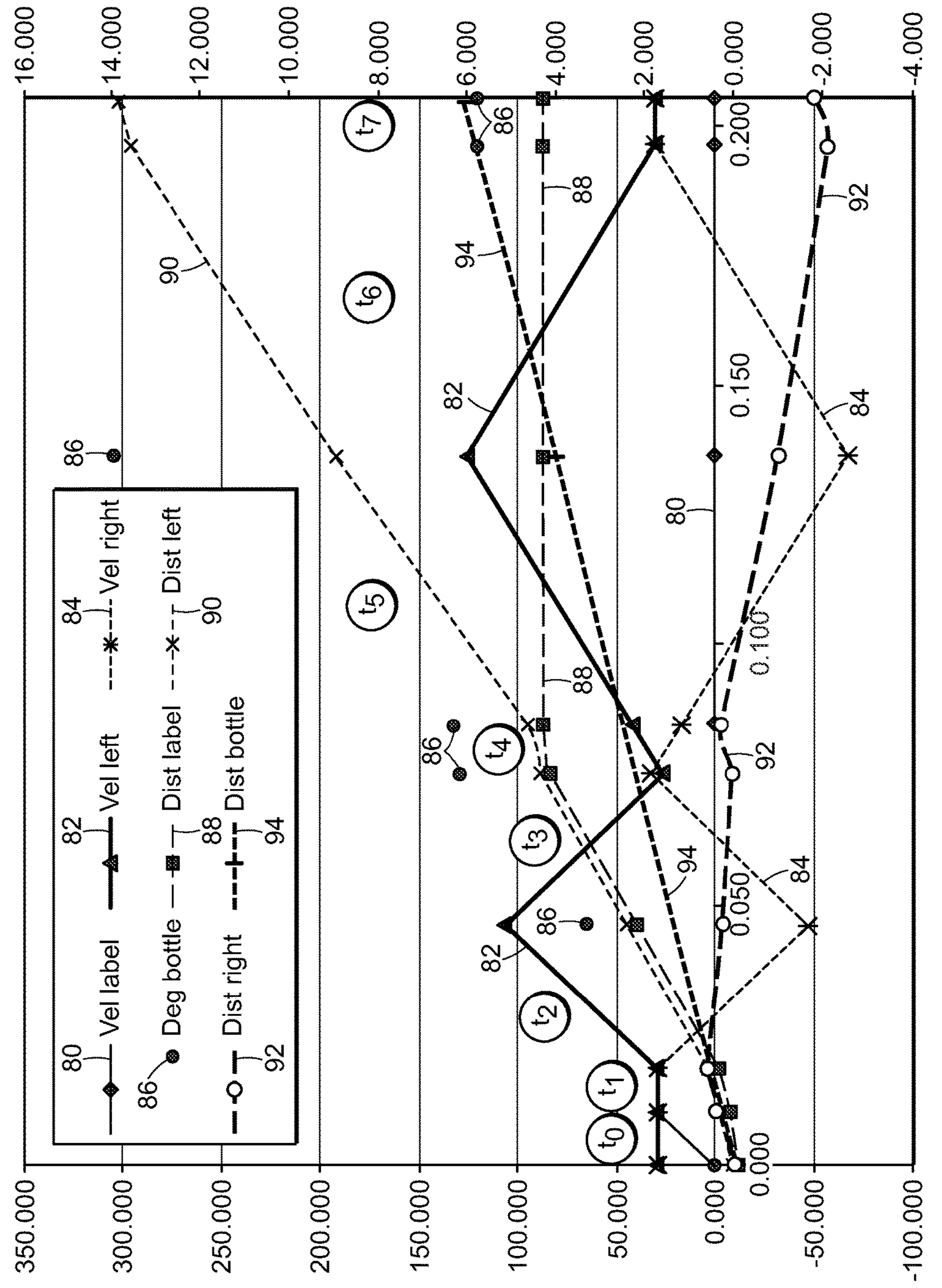
FIG. 8 shows an illustrative graphical representation of the operational parameters of FIGS. 7A-7C.

FIG. 7A shows distance, acceleration and velocity of the belts in a labeling and orientation process in accordance with a further embodiment on the invention where the timing is further divided (for analysis) into eight time segments. FIGS. 7B and 7C show the assigned parameters for such a system as well as intermediate results. FIG. 8 shows at 80, the velocity of the label, shows at 82 the velocity of the first belt, shows at 84 the velocity of the second belt, shows at 86 the degree of rotation of the bottle, shows at 88 the distance travelled by the label, shows at 90 the distance traveled by the first belt, shows at 92 the distance traveled by the second belt, and shows at 94 the distance travelled by the bottle. The composite graph also shows at $t_0$-$t_7$ the eight time segments.

Figure 10:
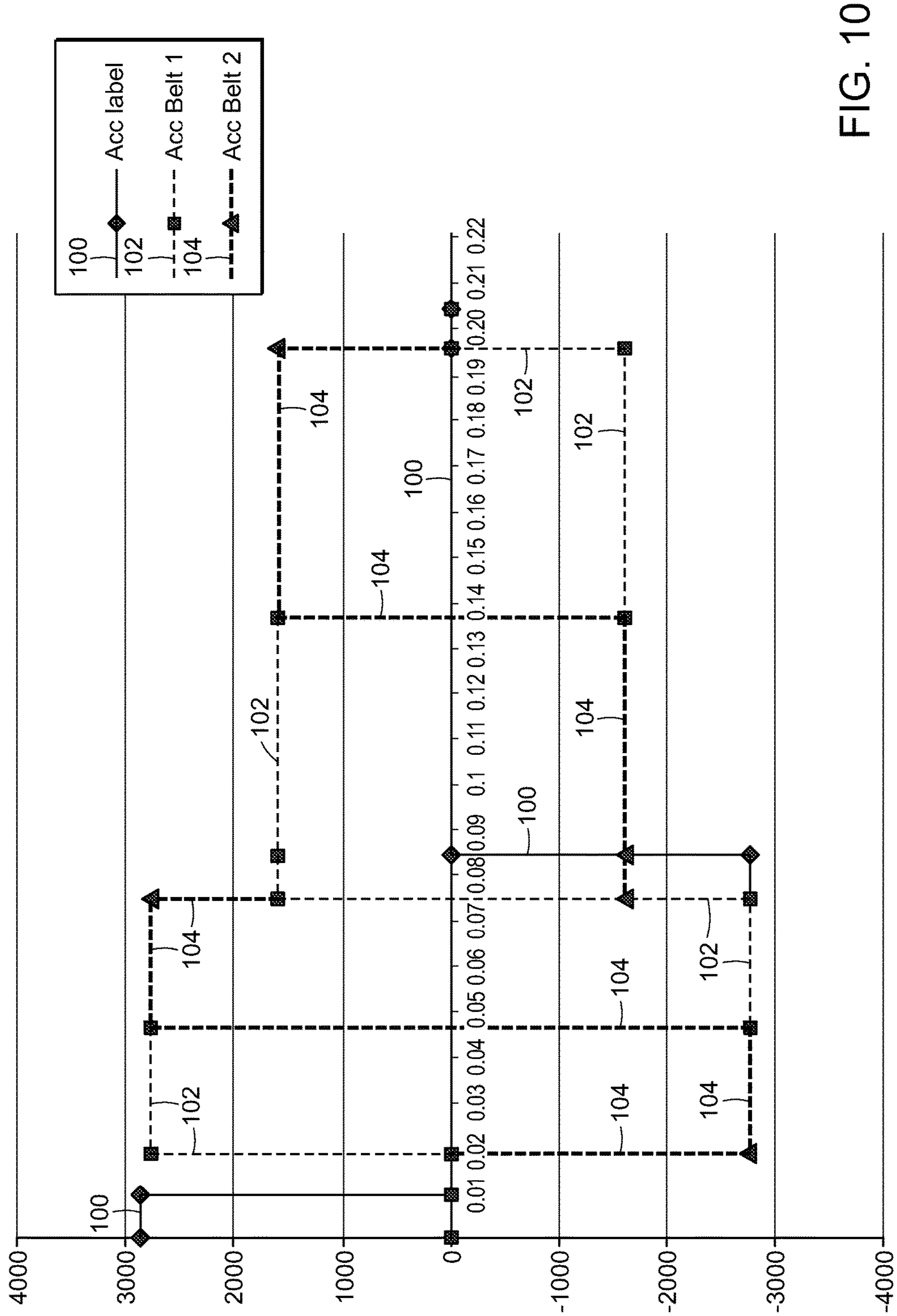
FIG. 10 shows an illustrative graphical representation of the operational acceleration parameters of FIG. 9.

FIG. 9 shows the acceleration of a label as well as the accelerations of the first and second belts at further time segments. FIG. 10 shows an illustrative graphical representation of the values of FIG. 9 wherein the acceleration of the label is shown at 100, the acceleration of the first belt is shown at 102 and the acceleration of the second belt is shown at 104.

Figure 12:
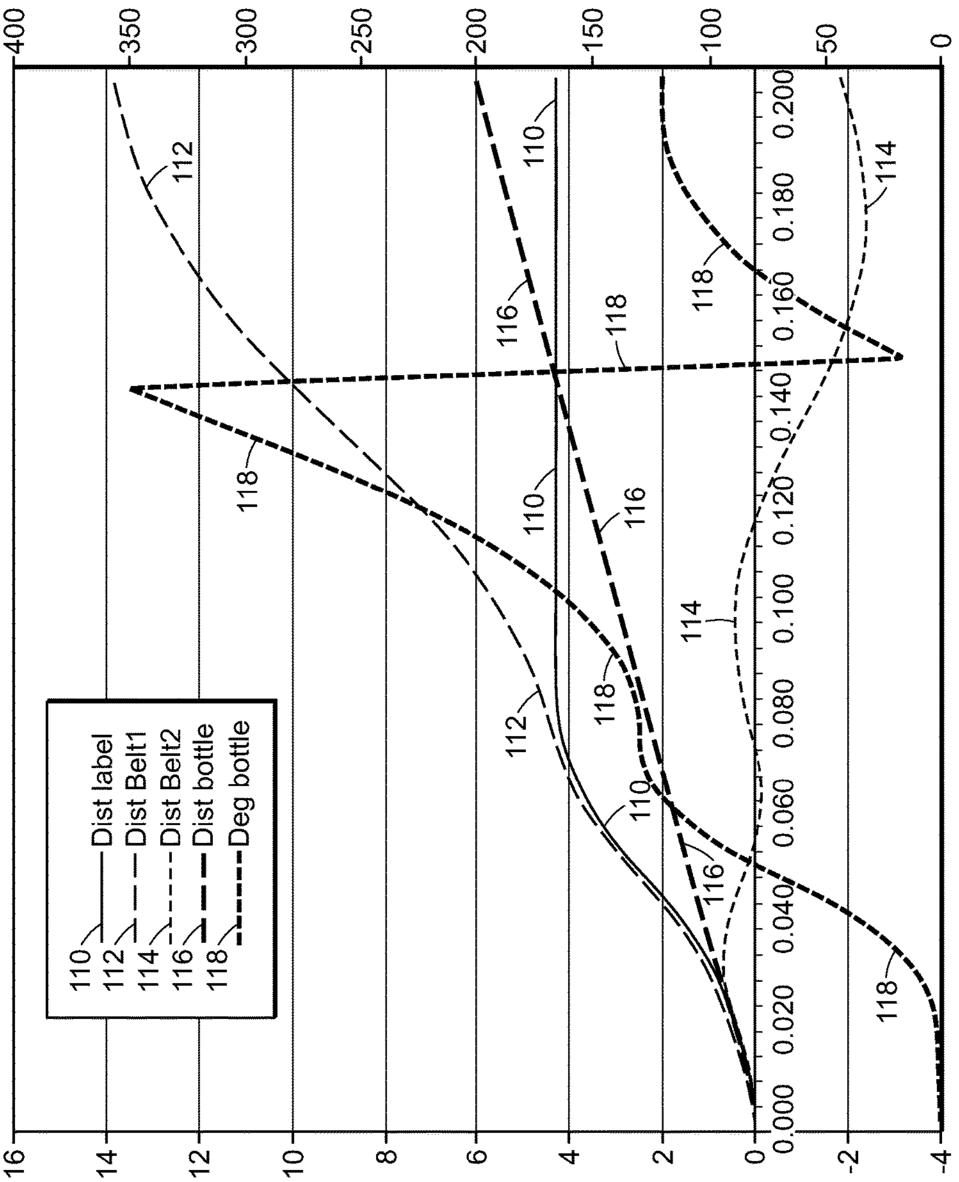
FIG. 12 shows an illustrative graphical representation of the operational parameters of FIG. 11.

FIG. 11 shows distances of the label, the first belt, the second belt and the bottle as well as the degree of rotation of the bottle for a labeling and orienting cycle that includes further time segments, and FIG. 12 shows the values the table of FIG. 11 wherein the distance of the label is shown at 110, the distance of the first belt is shown at 112, the distance of the second belt is shown at 114, the distance of the bottle is shown at 116 and the degree of rotation of the bottle is shown at 118.

Figure 13:
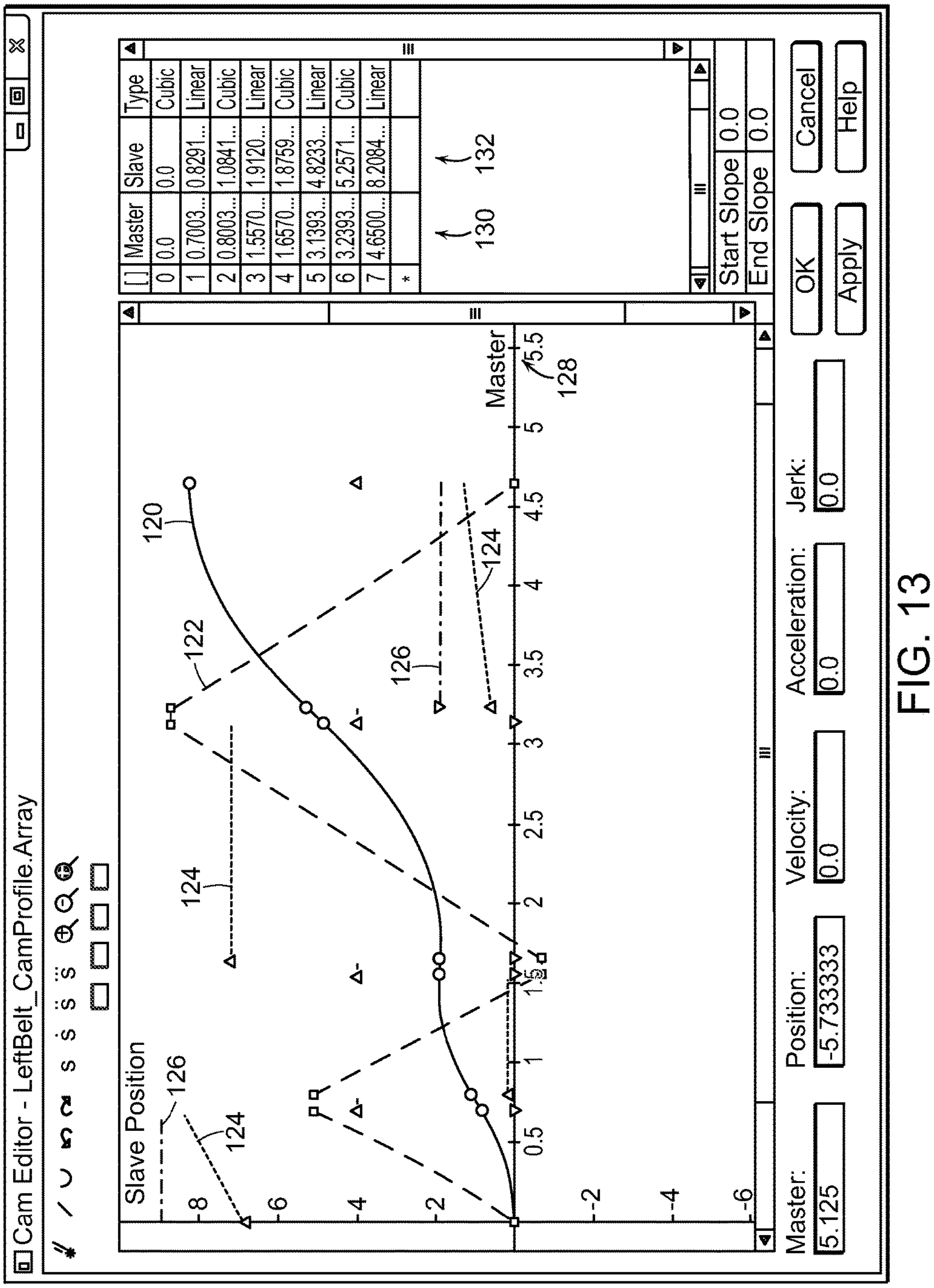
FIG. 13 shows an illustrative graphical representation of first belt movement profile in a system in accordance with an embodiment of the invention.

The first belt (the wrapping belt) may have movement profile as shown in FIG. 13. In particular, the slave position in time of the first belt (first belt position) is shown at 120 and the slave speed in time of the first belt (first belt speed) is shown at 122. The slave acceleration/deceleration in time (first belt acc./dec.) is shown at 124, and the slave jerk in time (first belt jerk) is shown at 126. The master position in time (conveyor position) shows at 128 that the conveyor speed is constant. The relations between the master-slave positions are shown in tabular form at 130, 132.

Figure 14:
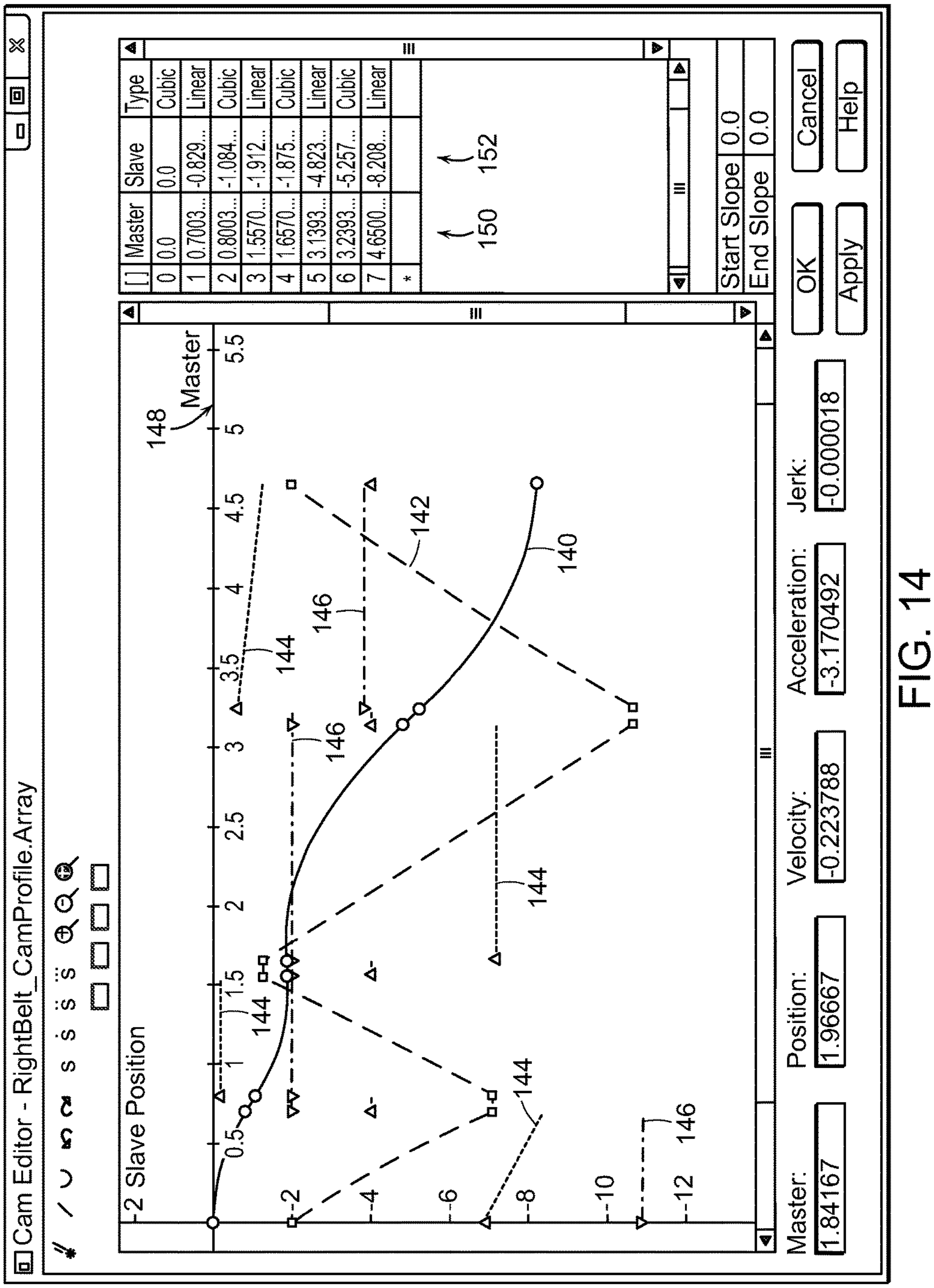
FIG. 14 shows an illustrative graphical representation of a second belt movement profile in a system in accordance with an embodiment of the invention.

The second belt (the backing belt) may have a movement profile as shown in FIG. 14. The slave position in time of the second belt (second belt position) is shown at 140 and the slave speed in time of the second belt (second belt speed) is shown at 142. The slave acceleration/deceleration in time (second belt acc./dec.) is shown at 144, and the slave jerk in time (second belt jerk) is shown at 146. The master position in time (conveyor position) shows at 148 that the conveyor speed is constant. The relations between the master-slave positions are shown in tabular form at 150, 152.

Figure 15:
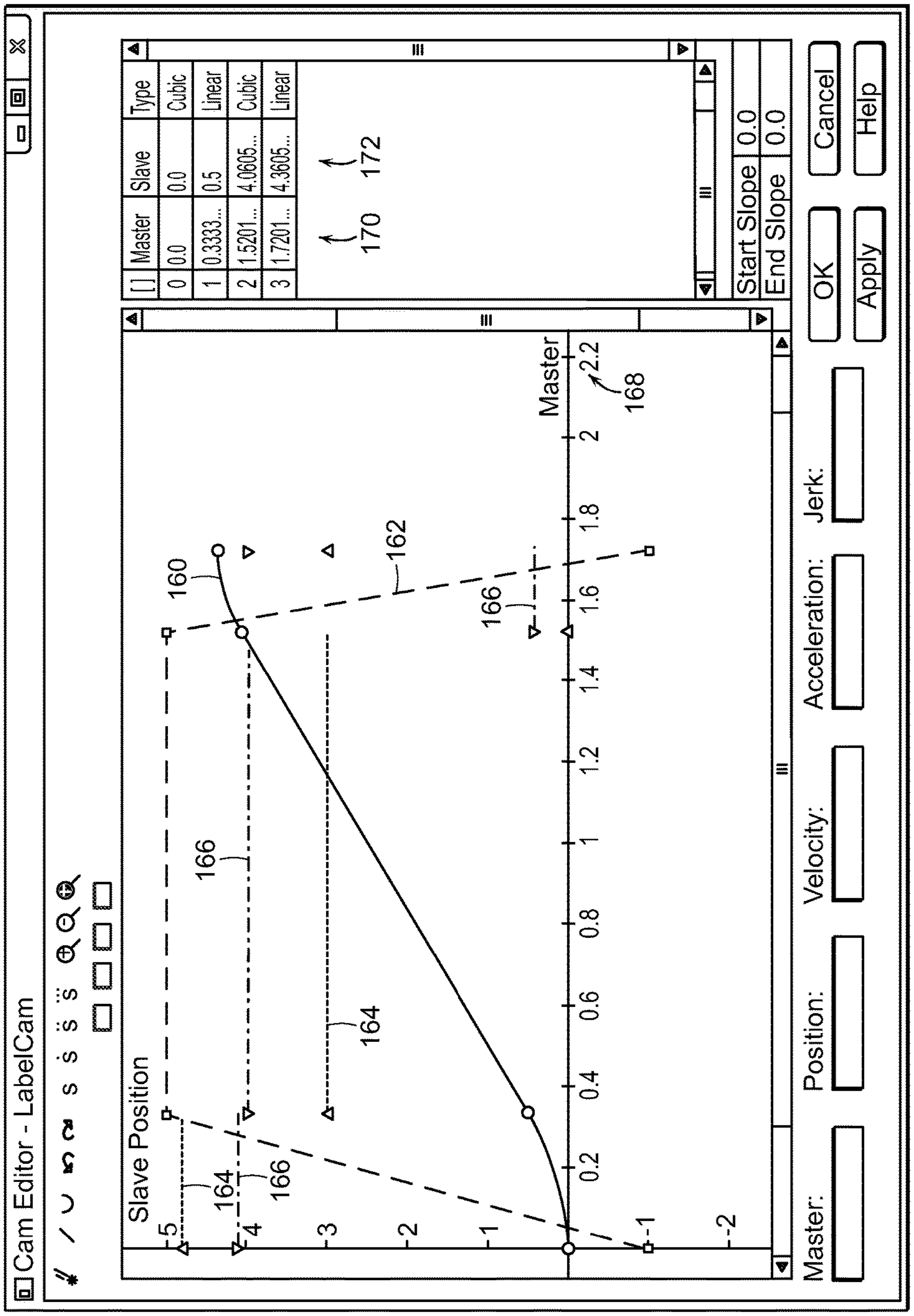
FIG. 15 shows an illustrative graphical representation of a first belt dispenser movement profile during labeling without orientation adjustment.

The first belt may have a dispenser movement profile as shown in FIG. 15 that is calculated when the dispenser is running in a standard roll-on application mode and is not modified by the orienting wrap belt. The slave position in time of the first belt (dispenser position std.) is shown at 160 and the slave speed in time of the first belt (dispenser speed std.) is shown at 162. The slave acceleration/deceleration in time (dispenser acc./dec. std.) is shown at 164, and the slave jerk in time (dispenser jerk std.) is shown at 166. The master position in time (conveyor position std.) shows at 168 that the conveyor speed is constant. The relations between the master-slave positions are shown in tabular form at 170, 172.

Figure 16:
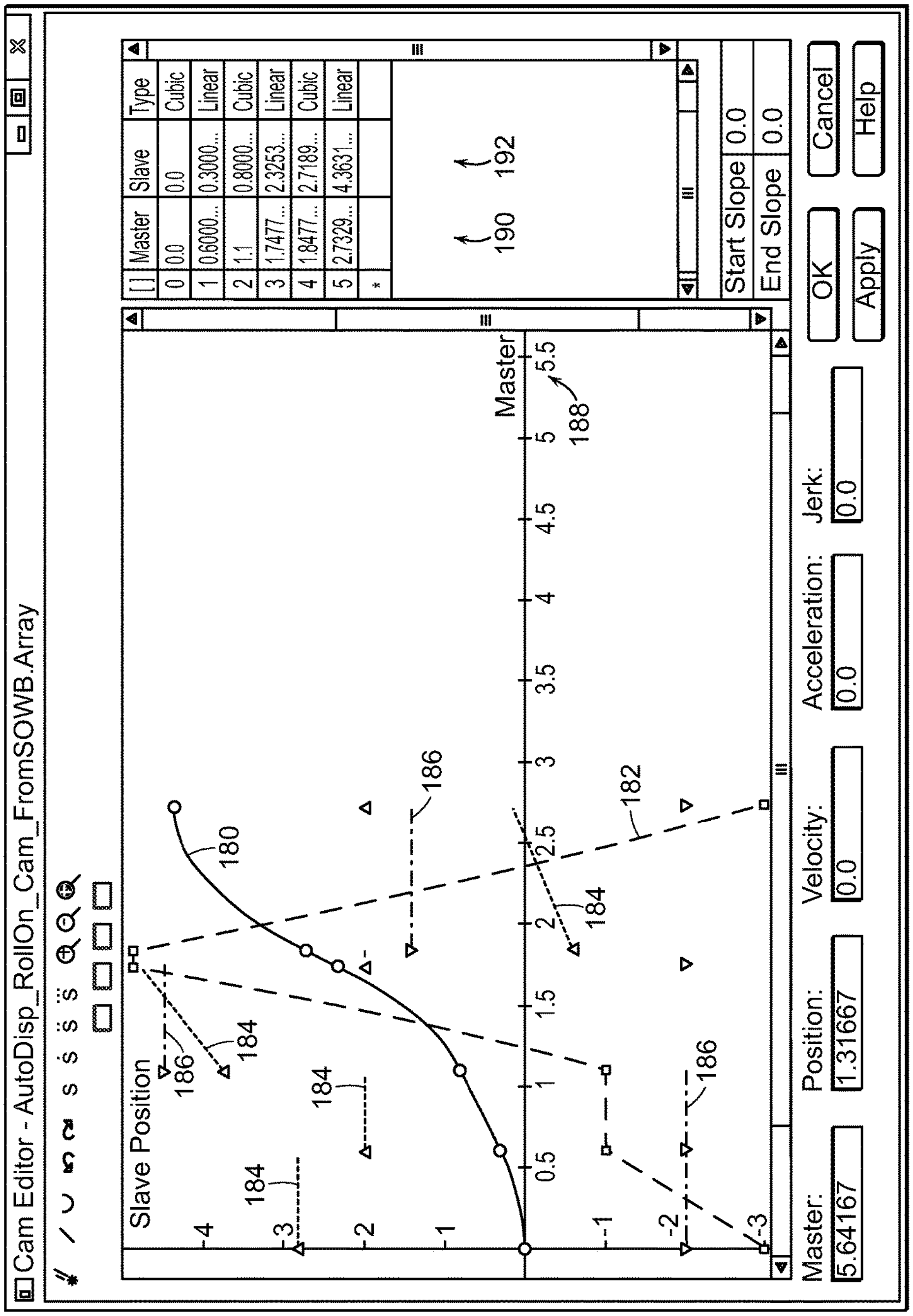
FIG. 16 shows an illustrative graphical representation of a first belt dispenser movement profile in a system in accordance with an embodiment of the invention.

The first belt dispenser movement profile (as shown in FIG. 16) is calculated by the servo orienting wrap belt and is transferred to the dispenser. The recalculation of the cam profile by the system is intended to synchronize the application of the label onto the bottle with the moves performed by the belts. The slave position in time of the first belt (dispenser position) is shown at 180 and the slave speed in time of the first belt (dispenser speed) is shown at 182. The slave acceleration/deceleration in time (dispenser acc./dec.) is shown at 184, and the slave jerk in time (dispenser jerk) is shown at 186. The master position in time (conveyor position) shows at 188 that the conveyor speed is constant. The relations between the master-slave positions are shown in tabular form at 190, 192.

The first dispenser therefore has three modes of operation. The first is a roll-on mode with label orientation. The second is a roll-on mode with no label orientation, and the third is a flag-on mode.

The roll-on mode of operation may be used when label wrapping & orientation is required. This mode will perform the initial label wrapping and then it will rotate the bottle so that when it exits the system, the label gap on the bottle will be positioned in a specific orientation. The roll-on mode with no label orientation mode of operation may be used when only label wrapping is required. This mode will perform the label wrapping process, but will not orient the bottle. The flag-on mode of operation may be used to attach a label onto a bottle without requiring the label to be wrapped onto the bottle.

Those skilled in the art will appreciate that numerous modifications and variations may be made to the above disclosed embodiments without departing from the spirit and scope of the present invention.

What is claimed is:

1. A method of orienting a container in a labeling system, said method comprising the steps of:

providing a plurality of containers on a conveyor, wherein the plurality of containers and the conveyor are moving at a constant velocity $V_C$;

receiving a given container of the plurality of containers between a first moving belt with velocity $V_A$ and a second moving belt with velocity $V_B$, said first and second moving belts capturing opposing sides of the given container while the given container remains on the conveyor, wherein at the time of capturing the given container between the first and second moving belts the velocities $V_A$ and $V_B$ are substantially equal to constant velocity $V_C$;

applying a label to the given container using at least one of the first and second moving belts;

adjusting the orientation of the given container by varying one or both of the velocities $V_A$ and $V_B$ while constant velocity $V_C$ remains constant and while the given container continues to move along a path of the conveyor, and the varying results in at least one of velocity $V_A$ or velocity $V_B$ no longer being substantially equal to constant velocity $V_C$; and releasing the given container from the first and second moving belts at the velocity $V_C$ on the conveyor, wherein at the time of releasing the given container from between the first and second moving belts, both velocities $V_A$ and $V_B$ are again substantially equal to the constant velocity $V_C$.

2. The method as claimed in claim 1, wherein said step of applying the label to the given container involves first receiving an exposed adhesive side of the label on a portion of the given container prior to having a non-adhesive side of the label contact the first moving belt.

3. The method as claimed in claim 1, wherein said step of applying the label to the given container involves first contacting the first moving belt with a non-adhesive side of the label and then contacting an adhesive side of the label to the given container.

4. The method as claimed in claim 2, wherein said containers are provided to a subsequent processing station following labeling and orientation.

5. The method as claimed in claim 1, wherein said method further includes the step of providing a top belt assembly for stabilizing the containers on the conveyor from above the containers at least one of prior to and following the steps of receiving the given container, adjusting the orientation of the given container and releasing the given container.

6. The method as claimed in claim 1, wherein said first and second moving belts each travel along a distance of the conveyor Y, that is less than a pitch P of the containers on the conveyor.

7. A method of labeling and orienting a container in a labeling system, said method comprising the steps of:

providing a plurality of containers on a conveyor wherein the containers and the conveyor are moving at a constant velocity $V_C$;

receiving a given container of the plurality of containers between a first moving belt with velocity $V_A$ and a second moving belt with velocity $V_B$, said first and second moving belts capturing opposing sides of the given container while the given container remains on the conveyor, wherein at the time of capture the velocities $V_A$ and $V_B$ are substantially oriented in a common direction and are substantially equal to the constant velocity $V_C$;

feeding a label toward an area between the first and second moving belts such that an exposed adhesive side of the label may be applied to the given container captured between the first and second moving belts;

applying the label to the given container using at least one of the first and second moving belts;

adjusting the orientation of the given container by changing one of the velocities $V_A$ and $V_B$ to be opposite in direction to the other of the velocities $V_A$ and $V_B$ while the given container continues to move along a path of the conveyor; and releasing the given container from the first and second moving belts, wherein at the time of releasing the given container, both velocities $V_A$ and $V_B$ are again substantially oriented in the common direction are again substantially equal to the constant velocity $V_C$.

8. The method as claimed in claim 7, wherein said step of feeding the label toward the area between the first and second moving belts involves moving a release web that includes a plurality of labels over a peel plate at a constant velocity $V_L$, wherein the peel plate is positioned proximate the first moving belt.

9. The method as claimed in claim 7, wherein said containers are provided to a subsequent processing station following labeling and orientation.

10. The method as claimed in claim 7, wherein said method further includes the step of providing a top belt assembly for stabilizing the containers on the conveyor from above the containers at least one of prior to and following the steps of receiving the given container, adjusting the orientation of the given container and releasing the given container.

11. The method as claimed in claim 7, wherein said first and second moving belts each travel along a distance of the conveyor Y, that is less than a pitch P of the containers on the conveyor.

12. The method as claimed in claim 7, wherein during the step of adjusting the velocities of $V_A$ and $V_B$, a velocity of the bottle does not exactly equal $V_C$.

13. The method as claimed in claim 7, wherein during the step of adjusting the velocities of $V_A$ and $V_B$, a velocity of the bottle substantially equals $V_C$.

14. The method as claimed in claim 7, wherein the step of feeding a label toward the area between the first and second moving belts involves first having an exposed adhesive side of the label contact the given container and subsequently having a non-adhesive side of the label contact the first moving belt.

15. The method as claimed in claim 7, wherein the step of feeding a label toward the area between the first and second moving belts involves first having a non-adhesive side of the label contact the first moving belt, and subsequently having an exposed adhesive side of the label contact the given container.

16. A method of labeling and orienting a container in a labeling system, said method comprising the steps of:

providing a plurality of containers on a conveyor wherein the containers and the conveyor are moving at a constant velocity $V_C$;

receiving a captured one container of the plurality of containers between a first moving belt with velocity $V_A$ and a second moving belt with velocity $V_B$, said first and second moving belts capturing opposing sides of the one container while the one container remains on the conveyor, wherein at the time of capture the velocities $V_A$ and $V_B$ are substantially equal to the constant velocity $V_C$, and wherein said first and second moving belts each travel along a distance of the conveyor Y that is less than a pitch P of the containers on the conveyor;

adjusting the orientation of the one container by varying one or both of the velocities $V_A$ and $V_B$ such that the velocities $V_A$ and $V_B$ are not substantially equal to each other, and releasing the one container from the first and second moving belts, wherein at the time of releasing the one container, both velocities $V_A$ and $V_B$ are again substantially equal to the constant velocity $V_C$.

17. The method as claimed in claim 16, wherein said method further includes the step of providing a top belt assembly for stabilizing the containers on the conveyor from above the containers at least one of prior to and following the steps of receiving the one container, adjusting the orientation of the one container and releasing the one container.

18. The method as claimed in claim 16, wherein method further includes the step of applying a label to the one container, and wherein the step of applying the label to the one container involves first receiving an exposed adhesive side of the label on a portion of the one container prior to having a non-adhesive side of the label contact the first moving belt.

19. The method as claimed in claim 16, wherein the method further includes the step of feeding a label toward an area between the first and second moving belts such that an exposed adhesive side of the label may be applied to the one container captured between the first and second moving belts.

20. The method as claimed in claim 19, wherein said step of feeding the label toward the area between the first and second moving belts involves moving a release web that includes a plurality of labels over a peel plate at a constant velocity $V_L$, wherein the peel plate is positioned proximate the first moving belt.

21. A method of orienting a container in a labeling system, said method comprising the steps of:

providing a plurality of containers on a conveyor wherein the containers and the conveyor are moving at a constant velocity $V_C$;

receiving a given container of the plurality of containers between a first moving belt with velocity $V_A$ and a second moving belt with velocity $V_B$, said first and second moving belts capturing opposing sides of the given container while the given container remains on the conveyor, wherein at the time of capturing the given container between the first and second moving belts, the velocities $V_A$ and $V_B$ are substantially equal to constant velocity $V_C$;

applying a label to the given container using at least one of the first and second moving belts;

adjusting the orientation of the given container by varying an acceleration rate associated with one or both of the first and second moving belts while constant velocity $V_C$ remains constant and while the given container continues to move along a path of the conveyor, and the varying results in at least one of velocity $V_A$ or velocity $V_B$ no longer being substantially equal to constant velocity $V_C$; and releasing the given container from the first and second moving belts at the velocity $V_C$ on the conveyor, wherein at the time of releasing the given container from between the first and second moving belts, both velocities $V_A$ and $V_B$ are again substantially equal to the constant velocity $V_C$.

* * * * *